US012101868B2

(12) United States Patent
Sun et al.

(10) Patent No.: US 12,101,868 B2
(45) Date of Patent: Sep. 24, 2024

(54) THERMAL PLASMA TREATMENT METHOD FOR SULFUR HEXAFLUORIDE DEGRADATION

(71) Applicant: XI'AN JIAOTONG UNIVERSITY, Shaanxi (CN)

(72) Inventors: Hao Sun, Shaanxi (CN); Mingzhe Rong, Shaanxi (CN); Yi Wu, Shaanxi (CN); Yunshun Guo, Shaanxi (CN); Hu Long, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 185 days.

(21) Appl. No.: 17/948,618

(22) Filed: Sep. 20, 2022

(65) Prior Publication Data

US 2024/0098870 A1 Mar. 21, 2024

(51) Int. Cl.

| | |
|---|---|
| ***H05H 1/42*** | (2006.01) |
| ***H05H 1/28*** | (2006.01) |
| ***H05H 1/34*** | (2006.01) |

(52) U.S. Cl.

CPC ................ *H05H 1/42* (2013.01); *H05H 1/28* (2013.01); *H05H 1/34* (2013.01); *H05H 2245/17* (2021.05)

(58) Field of Classification Search

CPC .. H05H 1/42; H05H 1/28; H05H 1/34; H05H 2245/17; H05H 1/3452; H05H 1/46; H05H 1/4652; H05H 2245/10

See application file for complete search history.

(56) References Cited

U.S. PATENT DOCUMENTS

| | | | | |
|---|---|---|---|---|
| 2010/0258309 | A1* | 10/2010 | Ayodele | E21B 43/243 166/272.3 |
| 2014/0154808 | A1* | 6/2014 | Patel | A61L 2/28 436/1 |
| 2020/0354220 | A1* | 11/2020 | Pedersen | C08J 5/005 |

* cited by examiner

*Primary Examiner* — Monica C King

(57) ABSTRACT

The present disclosure discloses a thermal plasma treatment method for sulfur hexafluoride ($SF_6$) degradation. In the thermal plasma treatment method for $SF_6$ degradation, Ar is input into a thermal plasma generator as a carrier gas; annular electrodes are electrically connected to a direct current power supply to generate an arc plasma region in the presence of the carrier gas Ar; to-be-reacted $SF_6$ and to-be-reacted $H_2$ in a predetermined ratio are input into the arc plasma region to generate hydrogen radicals as well as fluorine radicals, and the hydrogen radicals and the fluorine radicals are bonded with each other to generate HF to inhibit the self-recovery reaction of $SF_6$; and final products include HF and elemental S.

10 Claims, 4 Drawing Sheets

THERMAL PLASMA TREATMENT METHOD FOR SULFUR HEXAFLUORIDE DEGRADATION

TECHNICAL FIELD

The present disclosure belongs to the technical field of gas degradation, and particularly relates to a thermal plasma treatment method for sulfur hexafluoride ($SF_6$) degradation.

BACKGROUND $SF_6$ is a widely used insulating and arc extinguishing gas in a power system, but its potential greenhouse effect value is up to 23,500 times that of $CO_2$, so use of $SF_6$ has been restricted in many industries. Therefore, in the context of global efforts to reduce carbon emission, it is urgent to find a method that can efficiently degrade $SF_6$.

However, $SF_6$ has an extremely high self-recovery characteristic. Even if $SF_6$ is ionized under an arc condition, $SF_6$ molecules can also be quickly compounded, producing only a small amount of impurity gas. This allows $SF_6$ to quickly restore the dielectric ability and have good arc extinguishing ability, so $SF_6$ is widely used in the power system. However, in another aspect, this characteristic also makes it extremely difficult to degrade retired $SF_6$ gas.

The effect of an existing high-temperature pyrolysis method is not satisfactory. On one hand, a heating process consumes a lot of energy; and on the other hand, the degradation rate is relatively low, and the purpose of harmless degradation of $SF_6$ cannot be achieved.

In order to improve the energy efficiency of $SF_6$ degradation and the degradation rate, a plasma waste gas treatment technology has been widely studied in recent years. Common methods include a radio frequency plasma method, a microwave plasma method, a dielectric barrier discharge plasma method, and the like. However, they are all cold plasma methods with low reaction temperature and low discharge power. On one hand, $SF_6$ cannot be completely degraded into atoms, and on the other hand, $SF_6$ with a low concentration and a low flow rate can be degraded only, which is not conducive to industrial application. This disclosure aims at solving the above problems.

The above-mentioned information disclosed in the background is only for enhancing the understanding of the background of the present disclosure, and therefore may contain information that does not form the prior art that is well-known to a person of ordinary skill in the art in this country.

SUMMARY

For the problems in the prior art, the present disclosure provides a thermal plasma treatment method for sulfur hexafluoride ($SF_6$) degradation. The degradation rate and the treatment capability are improved by using a thermal plasma generator; the self-recovery of $SF_6$ is inhibited by using hydrogen-containing reaction gas, so that $SF_6$ is completely degraded into elemental S; the $SF_6$ treatment capability and the degradation rate are improved; and $SF_6$ molecules are completely degraded.

The purposes of the present disclosure are achieved by the following technical solutions. A thermal plasma treatment method for $SF_6$ degradation includes:

inputting Ar into a reaction cavity in a thermal plasma generator as a carrier gas, wherein the reaction cavity receives the carrier gas Ar through a swirler, and annular electrodes are electrically connected to a direct current power supply to generate an arc plasma region in the presence of the carrier gas Ar;

inputting to-be-reacted $SF_6$ and to-be-reacted reaction gas in a predetermined ratio into the arc plasma region to generate hydrogen/oxygen radicals and fluorine radicals, and bonding the hydrogen radicals and the fluorine radicals with each other to generate final products, wherein the final products mainly include acidic gas which can be absorbed by alkali liquid and is subjected to harmless treatment.

In the thermal plasma treatment method for $SF_6$ degradation, a sulfur powder filtering device communicates with the arc plasma region to filter out sulfur powder in mixed gas after the reaction in the arc plasma region; and an alkali liquid spraying tower communicates with the sulfur powder filtering device and sprays acidic exhaust gas from the sulfur powder filtering device with alkali liquid.

In the thermal plasma treatment method for $SF_6$ degradation, the predetermined ratio of $H_2$ to $SF_6$ is from a lower-limit ratio 3:1 to an upper-limit ratio, and the upper-limit ratio is limited by a harmful byproduct $H_2S$.

In the thermal plasma treatment method for $SF_6$ degradation, a predetermined ratio of Ar:$H_2$:$SF_6$ is 30 L/min:40 L/min:10 L/min.

In the thermal plasma treatment method for $SF_6$ degradation, Ar, $H_2$ and $SF_6$ are respectively introduced into the thermal plasma generator via swirlers. The three swirlers are all made of a polytetrafluoroethylene material and are respectively clung to three annular electrodes. The swirlers can resist HF corrosion and play insulating and supporting roles between the electrodes.

In the thermal plasma treatment method for $SF_6$ degradation, the thermal plasma generator includes a circulating water cooling interlayer which communicates with a water cooling system to drive a circulating water source in the water cooling interlayer, so that cooling water is in full contact with the electrodes and quickly brings away thermal loads on the electrodes.

In the thermal plasma treatment method for $SF_6$ degradation, the thermal plasma generator includes three annular electrodes which are respectively a cathode, an arc strike anode and an arcing anode; a high-voltage alternating voltage is first applied between the cathode and the arc strike anode during discharge to strike an arc; after arcing succeeds, a stable direct current is applied between the cathode and the arcing anode to maintain the discharge of the thermal plasma generator.

In the thermal plasma treatment method for $SF_6$ degradation, a negative electrode of the direct current power supply is connected to the cathode; a positive electrode of the direct current power supply is connected to the arc strike anode and the arcing anode; the direct current power supply generates an overvoltage for arc striking; after arcing, a constant current is provided; and the direct current power supply has an adjustable output power.

In the thermal plasma treatment method for $SF_6$ degradation, a working voltage of the direct current power supply is 150 V, and a working current of the direct current power supply is 100 A.

In the thermal plasma treatment method for $SF_6$ degradation, the alkali liquid spraying tower uses 5% $Ca(OH)_2$ alkali liquid.

Compared with the prior art, the present disclosure has the following advantages: are action temperature in the present disclosure is high; the temperature of thermal plasma exceeds the reaction temperature for completely degrading $SF_6$, so that the reaction rate is extremely high, and the $SF_6$ degradation rate exceeds 99%; composite reactions are weak; since F radicals are all captured by H radicals, basically no composite reactions will occur; degradation products mainly include HF which can be absorbed by alkali liquid and is convenient to treat; gas flows are uniformly mixed; under the action of the swirlers, inlet gases are mixed uniformly, so that the degradation effect can be improved, and the use amount of $H_2$ can be saved at the same time.

BRIEF DESCRIPTION OF THE DRAWINGS

By reading the detailed description in the preferred specific implementation modes below, various other advantages and benefits of the present disclosure will become clear to those of ordinary skill in the art. The accompanying drawings in the description are only used for the purpose of illustrating the preferred implementation modes, and are not considered as a limitation to the present disclosure. Obviously, the drawings described below are only some embodiments of the present disclosure. For those of ordinary skill in the art, other drawings can be obtained based on these drawings without creative work. Furthermore, throughout the drawings, the same reference signs are used to denote the same components.

In the drawings.

Figure 1:
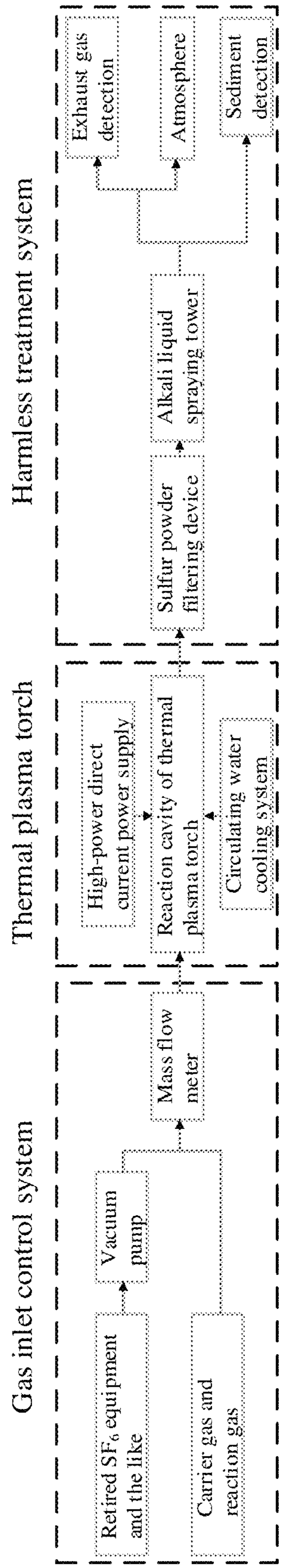
FIG. 1 is a schematic system diagram of a $SF_6$ degrading system based on thermal plasma in a thermal plasma treatment method for $SF_6$ degradation according to one embodiment of the present disclosure.
Figure 2:
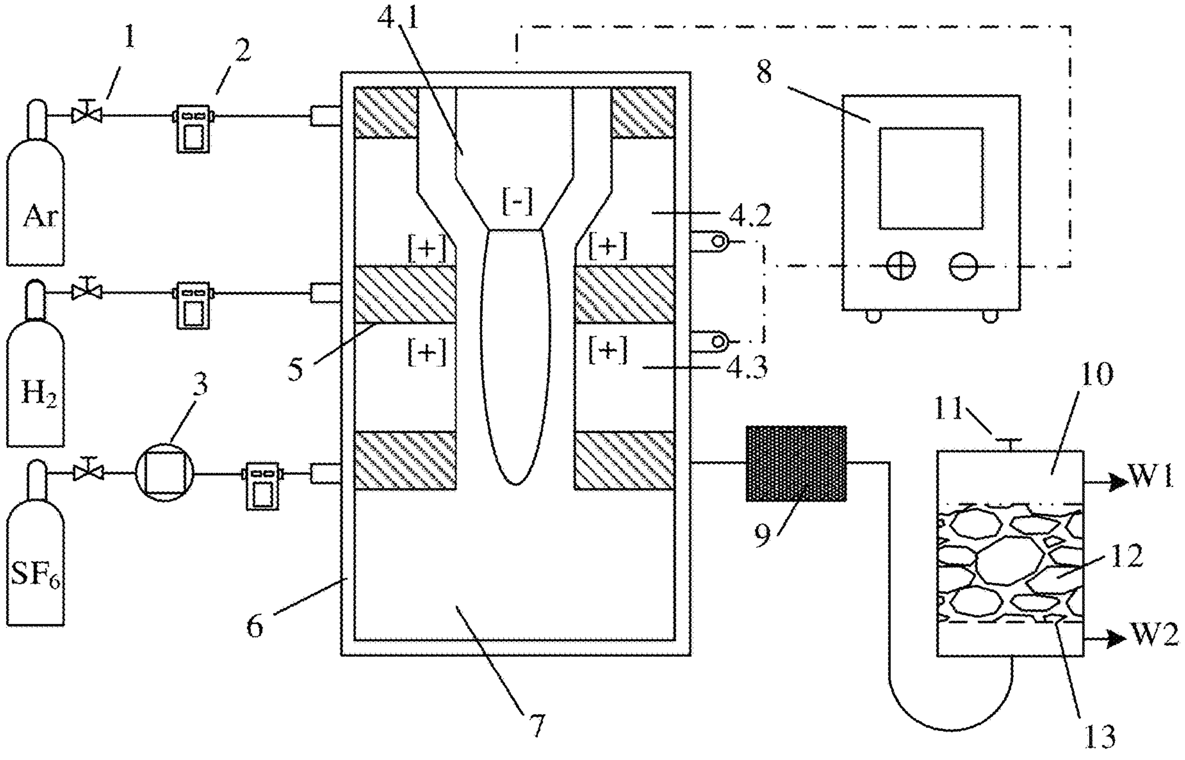
FIG. 2 is a schematic structural diagram of a degrading device in a thermal plasma treatment method for $SF_6$ degradation according to one embodiment of the present disclosure.

The present disclosure is further explained below in combination with the accompanying drawings and the embodiments.

DETAILED DESCRIPTION OF THE EMBODIMENTS

Specific embodiments of the present disclosure will be described in more detail below with reference to FIG. 1 to FIG. 6. Although specific embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

It should be noted that certain words are used in the specification and claims to refer to specific components. Those skilled in the art should understand that they may use different terms to refer to a same component. This specification and claims do not use differences in terms as a way to distinguish components, but use differences in functions of components as a criterion for distinguishing. If "comprise" or "include" mentioned in the entire specification and claims is an open term, it should be interpreted as "including but not limited to". The following description of the specification is a preferred implementation mode for implementing the present disclosure. However, the description is based on the general principles of the specification and is not intended to limit the scope of the present disclosure. The protection scope of the present disclosure shall be subject to those defined by the appended claims.

In order to facilitate the understanding of the embodiments of the present disclosure, specific embodiments will be used as an example for further explanation and description in conjunction with the accompanying drawings, and the drawings do not constitute a limitation to the embodiments of the present disclosure.

For better understanding, a thermal plasma treatment method for $SF_6$ degradation includes:

Ar is input into athermal plasma generator as a carrier gas, and annular electrodes are electrically connected to a direct current power supply to generate an arc plasma region in the presence of the carrier gas Ar.

In this example, a reaction gas is $H_2$. To-be-reacted $SF_6$ and to-be-reacted $H_2$ in a predetermined ratio are input into the arc plasma region to generate hydrogen radicals and fluorine radicals which are bonded with each other to generate HF to inhibit the self-recovery reaction of $SF_6$, and final products include HF and elemental S. A reaction temperature in the arc plasma region is 6000K-15000K.

In a preferable implementation of the thermal plasma treatment method for $SF_6$ degradation, a sulfur powder filtering device communicates with the arc plasma region to filter out sulfur powder in mixed gas after the reaction in the arc plasma region. An alkali liquid spraying tower communicates with the sulfur powder filtering device and sprays acidic exhaust gas from the sulfur powder filtering device with alkali liquid.

In one embodiment, as shown in FIG. 1 to FIG. 6, a $SF_6$ degrading system based on thermal plasma in the thermal plasma treatment method for $SF_6$ degradation includes:

a gas inlet control system which includes:

a carrier gas Ar input line including a carrier gas Ar source, a first gas valve 1 and a first mass flow meter 2 which are connected in sequence;

a reaction gas $H_2$ input line including a reaction gas $H_2$ source, a second gas valve and a second mass flow meter which are connected in sequence;

a $SF_6$ gas input line including a $SF_6$ gas source, a third gas valve, a vacuum pump 3 and a third mass flow meter which are connected in sequence;

a thermal plasma generator which includes:

a closed shell including a circulating water cooling interlayer 6 and a reaction cavity 7 enclosed by the water cooling interlayer 6, wherein the reaction cavity 7 communicates with the gas inlet control system to respectively receive a carrier gas Ar, a reaction gas $H_2$ and $SF_6$ according to a predetermined ratio through swirlers 5;

annular electrodes which are respectively a cathode 4.1, an arc strike anode 4.2 and an arcing anode 4.3 and are electrically connected to the direct current power supply 8 respectively to generate a thermal plasma jet flow, wherein the arc strike anode 4.2 also achieves effects of increasing an arc length and increasing an arc voltage to achieve high-power outputting at a low current; there are three swirlers 5, which are all made of a polytetrafluoroethylene material and are respectively clung to the three annular electrodes; the swirlers can resist HF corrosion and play an insulation role between the electrodes;

a harmless treatment system which includes:

a sulfur powder filtering device 9 communicating with the reaction cavity 7 to filter out sulfur powder in mixed gas from the reaction cavity 7;

an alkali liquid spraying tower 10 communicating with the sulfur powder filtering device 9 and including a mortar pump for cyclically pumping alkali liquid to form a spray;

a waste gas detection device communicating with the alkali liquid spraying tower 10 to sample and detect waste gas discharged from the alkali liquid spraying tower 10.

In a preferable embodiment of the $SF_6$ degrading device based on the thermal plasma, the carrier gas Ar has a flow rate of 30 L/min; the reaction gas $H_2$ has a flow rate of 40 L/min; and $SF_6$ has a flow rate of 10 L/min.

In a preferable embodiment of the $SF_6$ degrading device based on the thermal plasma, a negative electrode and a positive electrode of the direct current power supply 8 are respectively connected to the annular electrodes to first generate an overvoltage between the cathode 4.1 and the arc strike anode 4.2 for arc striking; after arcing, a constant current is provided between the cathode 4.1 and the arcing anode 4.3; and the direct current power supply 8 has an adjustable output power.

In a preferable embodiment of the $SF_6$ degrading device based on the thermal plasma, a working voltage of the direct current power supply 8 is 150 V, and a working current of the direct current power supply 8 is 100 A.

Figure 3:
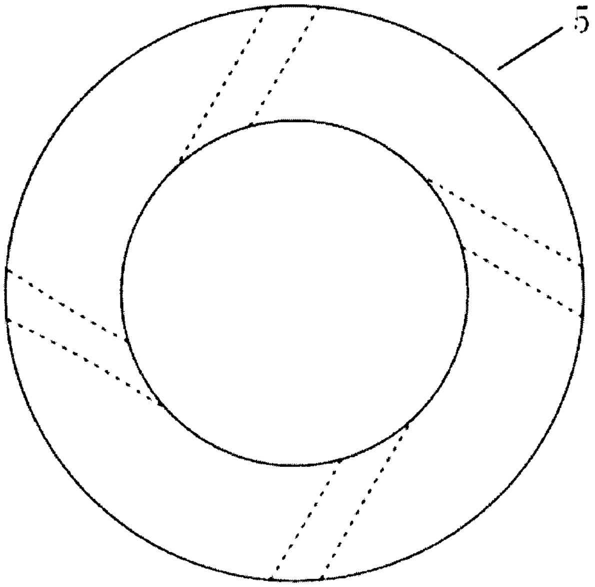
FIG. 3 is a schematic front view of a swirler in a thermal plasma treatment method for $SF_6$ degradation according to one embodiment of the present disclosure.

In a preferable embodiment of the $SF_6$ degrading device based on the thermal plasma, each swirler 5 internally includes a rotating gas path, as shown in FIG. 3, so that a gas flow field of input gas converges towards a center of the corresponding annular electrode.

Figure 5:
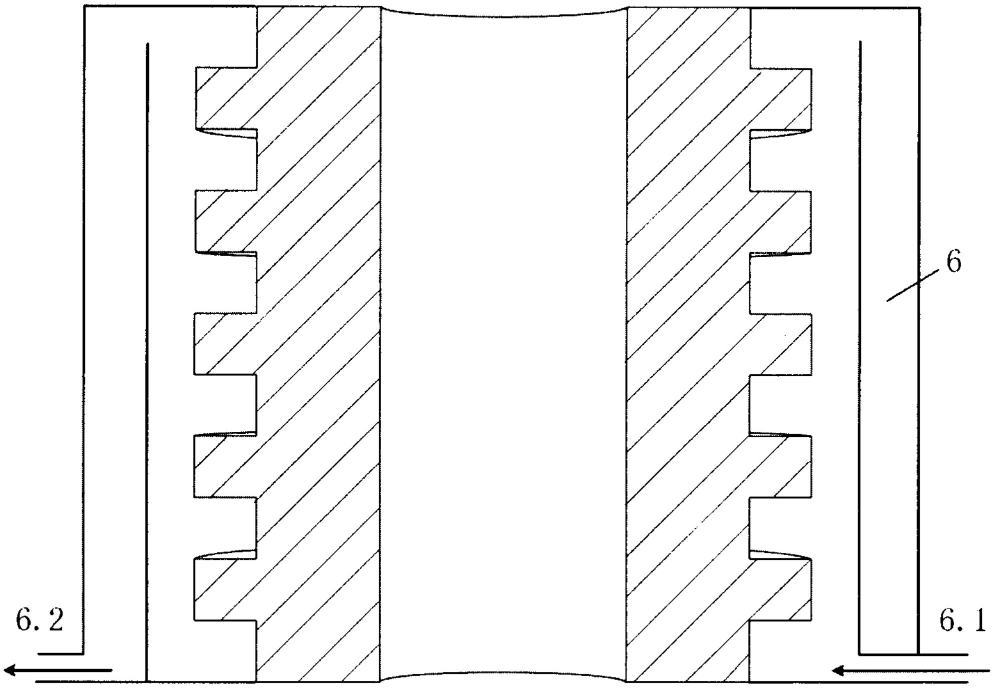
FIG. 5 is a schematic sectional view of a water cooling interlayer in a thermal plasma treatment method for $SF_6$ degradation according to one embodiment of the present disclosure.

In a preferable embodiment of the $SF_6$ degrading device based on the thermal plasma, the water cooling interlayer 6 adopts a split type once-through water cooling structure; a surface of a water path is provided with a concave-convex structure to enlarge a heat exchange area, as shown in FIG. 5; the device is cooled by using a circulating water source; cooling water first enters the device from a water inlet 6.1 to be in full contact with the electrodes and quickly brings away thermal loads on the electrodes; after passing through a flow guide plate, the cooling water is drained from a water outlet 6.2; the cooling is driven by a water pump; and the water pump has a lift of 45 m.

In a preferable embodiment of the $SF_6$ degrading device based on the thermal plasma, the alkali liquid spraying tower 10 is provided with a stainless steel pore plate used for placing a PE plastic fragment packing.

In a preferable embodiment of the $SF_6$ degrading device based on the thermal plasma, the alkali liquid spraying tower 10 uses 5% $Ca(OH)_2$ alkali liquid.

In a preferable embodiment of the $SF_6$ degrading device based on the thermal plasma, the waste gas detection device includes an X-ray diffraction analyzer, a chromatographic analyzer and a spectrum analyzer.

In a preferable embodiment of the $SF_6$ degrading device based on the thermal plasma, within the predetermined ratio, a flow rate ratio of $H_2$ to $SF_6$ is greater than 3.

In one embodiment, the $SF_6$ degrading device based on the thermal plasma includes a gas inlet control system, a thermal plasma generator and a harmless treatment system. The gas inlet control system includes input lines for three gases: $SF_6$, a carrier gas and a reaction gas; each gas input line includes a gas source, a gas valve and a mass flow meter; the mass flow meters control the flow rates of the three gases to be adjustable; a typical working state is as follows: the carrier gas Ar has a flow rate of 30 L/min; the reaction gas $H_2$ has a flow rate of 40 L/min; and $SF_6$ has a flow rate of 10 L/min. In addition, there is a vacuum pump 3 between the $SF_6$ gas source and the mass flow meter and the vacuum pump 3 can be used for directly pumping gas in equipment such as a retired $SF_6$ circuit breaker for degradation.

In one embodiment, the thermal plasma generator includes a direct current power supply 8, a reaction cavity 7 and a circulating water cooling system; a negative electrode and a positive electrode of the high-power direct current power supply 8 are respectively connected to a cathode and anodes of the thermal plasma generator. During working, the direct current power supply 8 will first generate an overvoltage for arc striking; after arcing, a stable current is then provided; and the power supply has an adjustable output power. A typical working state is at a voltage of 150 V and a current of 100 A. The reaction cavity 7 is used for accommodating the thermal plasma jet flow generated by discharge and degrading the input $SF_6$ here. A wall of the reaction cavity 7 adopts a high-temperature-resistant and corrosion-resistant material, and the reaction cavity is provided with a sulfur powder cleaning device; meanwhile, a front surface of the reaction cavity is provided with an observation window which is made of organic glass; the device is cooled by the circulating water cooling system using a circulating water source in a wall interlayer of the reaction cavity 7, and the cooling is driven by the water pump which has a lift of 45 m.

In one embodiment, the harmless treatment system includes a sulfur powder filtering device 9, an alkali liquid spraying tower 10, a waste gas detection device and a waste residue detection device. The sulfur powder filtering device 9 uses a bag collector, which requires the device to be sealed as a whole; and sulfur powder collected at the bottom can be recycled. The alkali liquid spraying tower 10 uses 5% $Ca(OH)_2$ alkali liquid, and a mortar pump is used to cyclically pump alkali liquid into air to form two layers of sprays which are in full contact with and absorb acidic exhaust gas to finally achieve a discharge standard. $CaF_2$ sediments collected at the bottom can be recycled. The waste gas detection device can adopt a chromatographic analyzer and a spectrum analyzer. After waste gas is discharged from the alkali liquid spraying tower 10, a sampling bag is used to collect the waste gas and the waste gas is detected. After it is detected that the waste gas meets the standard, the waste gas can be directly discharged into the atmosphere. The waste residue detection device can use an X-ray diffraction analyzer. Waste residues collected at the bottom of the alkali liquid spraying tower 10 need to be detected. The waste residues are treated after it is confirmed that no nontoxic byproducts are contained.

In one embodiment, electrodes of the plasma generator are annular electrodes which are made of copper tungsten and are respectively clung to the three swirlers 5 to achieve electrical insulation. Each swirler 5 internally includes a rotating gas path, so that a gas flow field of input gas converges towards a center of the corresponding electrode, so that arcing is kept in the center of the electrode to reduce ablation, and a stable thermal plasma jet flow is generated.

The reaction cavity 7 is used for accommodating the thermal plasma jet flow generated by discharge and degrading the input $SF_6$ here. The reaction cavity is made of stainless steel and is provided with a sulfur powder collection and cleaning device. The cavity can be opened to pull out a sulfur powder collection box. Meanwhile, a front surface of the reaction cavity 7 is provided with an observation window which is made of organic glass.

The harmless treatment system includes a sulfur powder filtering device 9, an alkali liquid spraying tower 10, a waste gas collection and detection outlet W1 and a waste residue collection and detection outlet W2.

The sulfur powder filtering device 9 uses a bag collector, which requires the device to be sealed as a whole, and sulfur powder collected at the bottom can be recycled.

Since $Ca(OH)_2$ can absorb HF and remove fluorine from waste liquid, the alkali liquid spraying tower 10 uses 5% $Ca(OH)_2$ alkali liquid which is added from a feed port 11; and a stainless steel pore plate 13 is added in the alkali liquid spraying tower 10 and is used for placing a PE fragment packing 12 to avoid production of large air bubbles in the alkali liquid. Exhaust gas is introduced from the bottom of an absorption tank and is in full contact with and absorbed by a $Ca(OH)_2$ suspension, so that the exhaust gas finally meets the discharge standard. The $CaF_2$ sediments collected at the bottom can be recycled.

The waste gas collection and detection outlet W1 can adopt a chromatographic analyzer and a spectrum analyzer. After waste gas is discharged from the alkali liquid spraying tower, a sampling bag is used to collect the waste gas and the waste gas is detected. After it is detected that the waste gas meets the standard, the waste gas can be directly discharged into the atmosphere. The waste residue collection and detection outlet W2 can use an X-ray diffraction analyzer. Waste residues collected at the bottom of the alkali liquid spraying tower 10 need to be detected. The waste residues are treated after it is confirmed that no nontoxic byproducts are contained.

The device in this example can work stably for a long time under an atmospheric pressure. In the implementation process, the water cooling system is first turned on to drive the circulating water source in the water cooling interlayer 6; and the gas valves, the vacuum pump and the mass flow meters are then turned on. After gas flow parameters are set, the thermal plasma generator is powered by the direct current power supply 8 to generate a thermal plasma jet flow; $SF_6$ reacts with $H_2$ in a high-temperature region and elemental S and HF gas are generated in the reaction cavity 7. The elemental S is removed by the sulfur powder filtering device 9, and the HF gas is removed by the alkali liquid spraying tower 10; the waste gas can be discharged after the finally obtained waste gas has been tested to meet the standard at the waste gas collection and detection outlet W1, and the waste residues can be discharged after waste residues have been tested to meet the standard at the waste residue collection and detection outlet W2.

When Ar serves as the carrier gas, arcing is more stable, power required to maintain the discharge is low, and Ar is not bonded with H or F to generate byproducts. As the reaction gas, $H_2$ reacts with $SF_6$ to only generate HF and S, which is convenient for harmless treatment.

Optionally, $N_2$ can be used as the carrier gas, so that the raw material is cheaper and readily available. However, N radicals and F radicals will be bonded with each other in the cooling process to generate $NF_3$ which is a greenhouse gas.

Optionally, the reaction gas can be other hydrogen-containing gases, which can also provide H radicals and F radicals which are bonded to generate HF. However, when $CH_4$ and $NH_3$ are used as the reaction gas, byproducts such as $CF_4$ and $NF_3$ will be generated, which are also greenhouse gases.

Optionally, the reaction gas can be oxygen-containing gas. The principle of the oxygen-containing gas for degrading $SF_6$ is slightly different from that of the hydrogen-containing gas. In the cooling process, instead of bonding with F radicals, O radicals are provided to be bonded with S to form a sulfur-oxygen double bond, and $SO_2F_2$, $SOF_2$, $SOF_4$, $SO_2$ and other compounds are generated, thereby inhibiting the self-recovery characteristic of $SF_6$. When $O_2$ is used as the reaction gas, the advantage is that no solid products are generated, but the disadvantage is that harmful byproducts such as $SO_2F_2$ are generated. When $H_2O$ is used as the reaction gas, a main product is still HF, but harmful byproducts such as $SO_2F_2$ are also generated. Particularly, the simultaneous presence of HF and $H_2O$ is highly corrosive and will reduce the service life of the device.

More preferably, the alkali liquid spraying tower can use a mortar pump to cyclically pump the alkali liquid into air to form two layers of sprays which are in full contact with and absorb acidic exhaust gas; the absorption effect is better; and relevant national standards can be met.

More preferably, a flow rate ratio of the introduced $H_2$ to $SF_6$ is slightly greater than 3, which can further improve the degrading effect of $SF_6$.

In one embodiment, Ar is used as the carrier gas to generate a stable direct current arc under a working condition of the thermal plasma generator, and to-be-reacted $SF_6$ and to-be-reacted $H_2$ are uniformly mixed and input through the swirlers; and a high temperature generated in the arc plasma region reaches a temperature for thoroughly decomposing the reaction gas, thus releasing a large number of hydrogen radicals and fluorine radicals. Since the bonding of the two radicals to generate HF has a smallest Gibbs free energy, most of the fluorine radicals are captured and no longer react with sulfur radicals to generate $SF_6$; and the final products after the reaction gas passes through the thermal plasma region include HF and elemental S. When the hydrogen is excessive, the degradation rate of $SF_6$ treated by this method can reach 99.6% or above, and the concentration of $SF_6$ in the exhaust gas can be less than 0.07%. A calculation method of the degradation rate is to divide a difference between the concentrations of input $SF_6$ and output $SF_6$ by the concentration of the input $SF_6$.

In one embodiment, the thermal plasma generator is powered by a high-power direct current power supply to generate a high-temperature arc plasma region by discharge; a reaction temperature in the arc plasma region can reach 6000K-15000K; the reaction temperature can also reach 3500K or more even if it is at a tail end of a thermal plasma jet flow outside an electric field region; and when the reaction temperature increases, the movement rate of gas molecules increases, which not only increases the number of collisions of the gas molecules within unit time. More importantly, the energy of the gas molecules increases, so that the percentage of activated molecules increases, thereby accelerating a $SF_6$ degradation reaction. The hydrogen-containing reaction gas includes $H_2$, $NH_3$, $CH_4$, $H_2S$, etc., generating H radicals which are bonded with F radicals released by $SF_6$ in the thermal plasma region to inhibit the self-recovery characteristic of $SF_6$; when the reaction temperature is sufficient High, assuming that all the gas molecules are decomposed into S, F, H radicals, since the generation of elemental S and HF has a lower Gibbs free energy than the self-recovery generation of $SF_6$ and $H_2$, the final products are more likely to be HF rather than $SF_6$ according to the principle of a minimum Gibbs free energy; and at the same time, according to a calculation result of Gibbs free energy change, when the reaction temperature is higher than 2534K, an activation energy required for complete degradation of $SF_6$ into S radicals and F radicals can be provided. The resulting overall reaction is as follows:

$$SF_6+3H_2 \rightarrow S+6HF\ \Delta H=-419.3\ \text{kJ/mol},\ \Delta S=697\ \text{J/(mol·K)}$$

Figure 6:
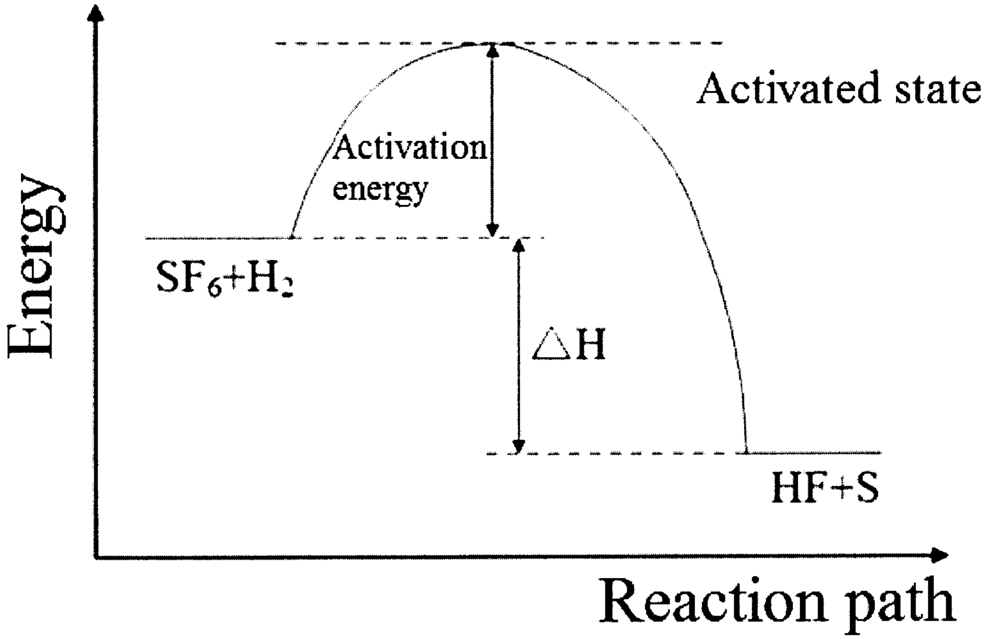
FIG. 6 is a schematic diagram of a reaction principle of a thermal plasma treatment method for $SF_6$ degradation according to one embodiment of the present disclosure.

At this time, the numerical value of $\Delta H-T\Delta S$ is much less than 0, and the reaction can proceed rapidly and spontaneously. The reaction principle is as shown in FIG. 6. A optimal predetermined ratio of $H_2$ to $SF_6$ is 3:1, but in practical application, in order to ensure the degradation effect of $SF_6$, a $H_2$ ratio should be slightly excessive, and the predetermined ratio may be 4:1.

Figure 4:
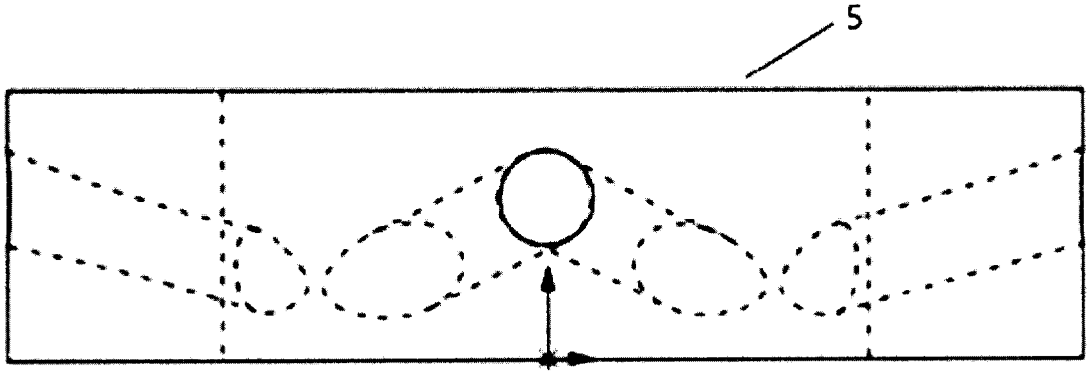
FIG. 4 is a schematic top view of a swirler in a thermal plasma treatment method for $SF_6$ degradation according to one embodiment of the present disclosure.

In one embodiment, regulation and control of a gas flow field have two main functions. One function is to generate a rotating gas flow through the swirler, so that an arc root of the arc continuously moves on the surfaces of the electrodes to reduce local electrode ablation and prolong the service life of the electrodes. Meanwhile, multiple symmetrical rotating gas inlets make the reaction gas fully mixed to reduce the use amount of $H_2$ and improve the degradation effect of $SF_6$. The other function is to enable the gas flow to generate a downward velocity component through the swirler, which can make the arcing more stable and concentrated and make the gas flow field of the input gas more converge to the high-temperature region in the center of the arc, so as to improve the degradation effect. Each swirler 5 includes four symmetrical clockwise rotating gas inlets, as shown in FIG. 4.

In one embodiment, the closed shell includes a reaction cavity 7 such as a pneumatic cooling expansion cavity and a water cooling interlayer 6. When a gas flow after $SF_6$ degradation enters the pneumatic cooling expansion cavity from a narrow reaction gas path, due to the sudden expansion of a gas volume, a flow velocity decreases rapidly, which achieves a cooling effect; and in combination with circulating water cooling heat exchange in the water cooling interlayer 6 on the cavity wall, rapid cooling of the reaction gas is achieved. The device in this example can work stably for a long time under an atmospheric pressure. In the implementation process, the device is characterized in that firstly, the water cooling system is turned on to drive the circulating water source in the water cooling interlayer 6; the reaction gas is then introduced from the swirler 5; the power supply of the thermal plasma generator is finally turned on to generate the thermal plasma jet flow; and $SF_6$ reacts with $H_2$ in the high-temperature region and elemental S and HF gas are generated. After the reaction ends, the power supply of the plasma generator is turned off first; the three gas inlets are then closed; and the cooling water source is turned off at last. In this example, when the hydrogen is excessive, the degradation rate of $SF_6$ can reach 99.6% or above, and the concentration of $SF_6$ in the exhaust gas can be less than 0.07%. The calculation method of the degradation rate is to divide a difference between the concentrations of input $SF_6$ and output $SF_6$ by the concentration of the input $SF_6$. In addition, in this example, the $SF_6$ treatment capability can reach 10 L/min or more.

Optionally, the carrier gas can be replaced by gas such as $N_2$, and the reaction gas can be replaced by hydrogen-containing gas such as $CH_4$, $NH_3$ and $H_2S$.

Optionally, the three-annular-electrode structure can be replaced by a double-electrode structure, but the double-electrode structure will lead to narrowing of the thermal plasma region and put forward higher requirements on the power supply of the thermal plasma generator.

Optionally, the three gas inlets can be replaced by two gas inlets or a single gas inlet, which can make the reaction gas mixed more uniformly, but also lead to problems such as the adhesion of sulfur powder on the surface of the electrode to reduce the service life of the electrode.

More preferably, an electrode material can be replaced by a material with better conductivity and higher corrosion resistance, such as silver tungsten.

More preferably, the material of the reaction cavity of the thermal plasma generator can be replaced by Hastelloy C-2000, which is more resistant to HF gas corrosion than ordinary stainless steel.

When an enough amount of $H_2$ is used as the reaction gas, degradation products only include HF and elemental S which is solid powder. The elemental S is separated and stored in a sulfur powder collection device, and HF can be absorbed by the $Ca(OH)_2$ solution in the alkali liquid tower to generate harmless $CaF_2$ sediments. When there is a little $H_2$, degradation products will also include sulfur fluoride compounds such as $SF_4$ and $SF_2$ in addition to HF and elemental S. These acidic gases can also be absorbed by $Ca(OH)_2$ to generate harmless $CaSO_4$ sediments. When $O_2$ is used as the reaction gas, degradation products include acidic gas such as $SO_2F_2$, $SOF_2$, $SOF_4$ and $SO_2$. They can also be absorbed by $Ca(OH)_2$ to generate harmless $CaSO_4$ sediments.

Although the embodiments of the present disclosure are described above with reference to the accompanying drawings, the present disclosure is not limited to the above specific embodiments and application fields. The above specific embodiments are only illustrative and instructive, but not restrictive. Under the enlightenment of this specification and without departing from the scope of protection of the claims of the present disclosure, those of ordinary skill in the art can also make many forms, which all fall within the protection of the present disclosure.

What is claimed is:

1. A thermal plasma treatment method for sulfur hexafluoride ($SF_6$) degradation, comprising the following steps:

inputting Ar into a reaction cavity in a thermal plasma generator as a carrier gas, wherein the reaction cavity receives the carrier gas Ar through a swirler, and annular electrodes are electrically connected to a direct current power supply to generate an arc plasma region in the presence of the carrier gas Ar; and inputting to-be-reacted $SF_6$ and to-be-reacted reaction gas in a predetermined ratio into the arc plasma region to generate hydrogen/oxygen radicals and fluorine radicals, and bonding the hydrogen/oxygen radicals and the fluorine radicals with each other to generate final products, wherein the final products mainly comprise acidic gas which can be absorbed by alkali liquid and is subjected to harmless treatment.

2. The thermal plasma treatment method for $SF_6$ degradation according to claim 1, wherein a sulfur powder filtering device communicates with the arc plasma region to filter out sulfur powder in mixed gas after the reaction in the arc plasma region; and an alkali liquid spraying tower communicates with the sulfur powder filtering device and sprays acidic exhaust gas from the sulfur powder filtering device with alkali liquid.

3. The thermal plasma treatment method for $SF_6$ degradation according to claim 1, wherein the predetermined ratio of $H_2$ to $SF_6$ is from a lower-limit ratio 3:1 to an upper-limit ratio, and the upper-limit ratio is limited by a harmful byproduct $H_2S$.

4. The thermal plasma treatment method for $SF_6$ degradation according to claim 1, wherein a predetermined ratio of $Ar:H_2:SF_6$ is 30 L/min:40 L/min:10 L/min.

5. The thermal plasma treatment method for $SF_6$ degradation according to claim 1, wherein Ar, $H_2$ and $SF_6$ are respectively introduced into the thermal plasma generator via swirlers.

6. The thermal plasma treatment method for $SF_6$ degradation according to claim 1, wherein the thermal plasma generator comprises a circulating water cooling interlayer which communicates with a water cooling system to drive a circulating water source in the water cooling interlayer.

7. The thermal plasma treatment method for $SF_6$ degradation according to claim 1, wherein the thermal plasma generator comprises three annular electrodes which are respectively a cathode, an arc strike anode and an arcing anode; a high-voltage alternating voltage is first applied between the cathode and the arc strike anode to strike an arc; after arcing succeeds, a stable direct current is applied between the cathode and the arcing anode to maintain the discharge of the thermal plasma generator.

8. The thermal plasma treatment method for $SF_6$ degradation according to claim 7, wherein a negative electrode of the direct current power supply is connected to the cathode; a positive electrode of the direct current power supply is connected to the arc strike anode and the arcing anode; the direct current power supply generates an overvoltage for arc striking; after arcing, a constant current is provided; and the direct current power supply has an adjustable output power.

9. The thermal plasma treatment method for $SF_6$ degradation according to claim 8, wherein a working voltage of the direct current power supply is 150 V, and a working current of the direct current power supply is 100 A.

10. The thermal plasma treatment method for $SF_6$ degradation according to claim 2, wherein the alkali liquid spraying tower uses 5% $Ca(OH)_2$ alkali liquid.

* * * * *